US012761919B2

(12) United States Patent
Cohen et al.

(10) Patent No.: US 12,761,919 B2
(45) Date of Patent: Oct. 13, 2026

(54) SYSTEM AND METHOD FOR CONFIGURABLE AND DISTRIBUTED PROCESSING FOR QUANTUM CONTROL

(71) Applicant: Quantum Machines, Tel Aviv (IL)

(72) Inventors: Yonatan Cohen, Tel Aviv (IL); Nissim Ofek, Tel Aviv (IL); Itamar Sivan, Tel Aviv (IL); Nir Halay, Tel Aviv (IL); Ori Weber, Tel Aviv (IL)

(73) Assignee: Q.M Technologies Ltd. (IL)

( * ) Notice: Subject to any disclaimer, the term of this patent is extended or adjusted under 35 U.S.C. 154(b) by 1184 days.

(21) Appl. No.: 17/316,200

(22) Filed: May 10, 2021

(65) Prior Publication Data

US 2022/0357948 A1 Nov. 10, 2022

(51) Int. Cl.
*G06F 9/30* (2018.01)
*G06F 13/28* (2006.01)
*G06N 10/00* (2022.01)

(52) U.S. Cl.
CPC .......... *G06F 9/30036* (2013.01); *G06F 13/28* (2013.01); *G06N 10/00* (2019.01)

(58) Field of Classification Search
CPC .... G06N 10/00; G06N 10/80; G06F 9/30036; G06F 13/28
See application file for complete search history.

(56) References Cited

U.S. PATENT DOCUMENTS 4,875,484 A 10/1989 Anzai et al.
5,063,354 A 11/1991 Lauper et al.
5,194,907 A 3/1993 Hayashi
6,223,228 B1 4/2001 Ryan et al.
6,426,984 B1 7/2002 Perino et al.
6,993,108 B1 1/2006 Chi et al.
7,451,292 B2 11/2008 Routt
7,535,931 B1 5/2009 Zampetti et al.
7,627,126 B1 12/2009 Pikalo
8,315,969 B2 11/2012 Roetteler
8,385,878 B2 2/2013 Rao
8,750,717 B1 6/2014 Yap et al.
9,207,672 B2 12/2015 Williams
9,400,499 B2 7/2016 Williams
9,509,324 B2 11/2016 McDonald et al.
9,663,358 B1 5/2017 Cory et al.
9,692,423 B2 6/2017 McDermott, III
(Continued)

FOREIGN PATENT DOCUMENTS

CA 2420022 2/2003
CN 1808103 A 7/2006
(Continued)

OTHER PUBLICATIONS

U.S. Appl. No. 62/294,966, filed Feb. 12, 2016.
(Continued)

*Primary Examiner* — Tewodros E Mengistu
(74) *Attorney, Agent, or Firm* — McAndrews Held & Malloy, Ltd.

(57) ABSTRACT

A distributed plurality of quantum controllers operate synchronously on shared data. The operations performed in each quantum controller may be non-deterministic and based on a dynamic instruction indication. The shared data may be based on results from all of the plurality of quantum controllers.

29 Claims, 4 Drawing Sheets

(56) References Cited

U.S. PATENT DOCUMENTS

| | | | | |
|---|---|---|---|---|
| 9,847,121 | B2 | 12/2017 | Frank | |
| 9,858,531 | B1 | 1/2018 | Monroe | |
| 9,892,365 | B2 | 2/2018 | Rigetti | |
| 9,978,020 | B1 | 5/2018 | Gambetta | |
| 9,979,400 | B1 | 5/2018 | Sete | |
| 9,996,801 | B2 | 6/2018 | Shim | |
| 10,063,228 | B2 | 8/2018 | Deurloo et al. | |
| 10,122,351 | B1 | 11/2018 | Naaman | |
| 10,127,499 | B1 | 11/2018 | Rigetti | |
| 10,192,168 | B2 | 1/2019 | Rigetti | |
| 10,223,643 | B1 | 3/2019 | Bishop et al. | |
| 10,333,503 | B1 | 6/2019 | Cohen et al. | |
| 10,454,459 | B1* | 10/2019 | Cohen | H03K 3/38 |
| 10,496,069 | B2 | 12/2019 | Nazarathy et al. | |
| 10,505,524 | B1 | 12/2019 | Cohen | |
| 10,560,076 | B1 | 2/2020 | Cohen | |
| 10,637,449 | B1 | 4/2020 | Cohen et al. | |
| 10,659,018 | B1 | 5/2020 | Cohen | |
| 10,666,238 | B1 | 5/2020 | Cohen | |
| 10,958,253 | B1 | 3/2021 | Cohen et al. | |
| 10,985,739 | B2 | 4/2021 | Cohen et al. | |
| 11,010,145 | B1 | 5/2021 | Smith et al. | |
| 11,463,075 | B2 | 10/2022 | Cohen et al. | |
| 11,616,497 | B2 | 3/2023 | Cohen et al. | |
| 11,616,498 | B2 | 3/2023 | Cohen et al. | |
| 2002/0004876 | A1 | 1/2002 | Timmer et al. | |
| 2004/0266084 | A1 | 12/2004 | Fujishima et al. | |
| 2005/0015422 | A1 | 1/2005 | Kohn et al. | |
| 2005/0180575 | A1 | 8/2005 | Maeda et al. | |
| 2006/0093376 | A1 | 5/2006 | Mitchell et al. | |
| 2008/0037693 | A1 | 2/2008 | Andrus et al. | |
| 2010/0072979 | A1 | 3/2010 | Fefer et al. | |
| 2011/0035511 | A1 | 2/2011 | Biederman | |
| 2013/0198499 | A1 | 8/2013 | Dice et al. | |
| 2016/0125311 | A1 | 5/2016 | Fuechsle et al. | |
| 2016/0267032 | A1 | 9/2016 | Rigetti et al. | |
| 2016/0292586 | A1 | 10/2016 | Rigetti et al. | |
| 2017/0094618 | A1 | 3/2017 | Bjorkengren | |
| 2017/0214410 | A1 | 7/2017 | Hincks et al. | |
| 2017/0364796 | A1 | 12/2017 | Wiebe | |
| 2018/0013426 | A1 | 1/2018 | Deurloo et al. | |
| 2018/0032893 | A1 | 2/2018 | Epstein | |
| 2018/0091244 | A1 | 3/2018 | Abdo | |
| 2018/0107579 | A1 | 4/2018 | Chapman | |
| 2018/0123597 | A1 | 5/2018 | Sete | |
| 2018/0237039 | A1 | 8/2018 | Mong et al. | |
| 2018/0260245 | A1* | 9/2018 | Smith | G06F 9/542 |
| 2018/0260730 | A1 | 9/2018 | Reagor | |
| 2018/0260732 | A1 | 9/2018 | Bloom | |
| 2018/0308007 | A1 | 10/2018 | Amin | |
| 2018/0322409 | A1 | 11/2018 | Barends | |
| 2018/0365585 | A1 | 12/2018 | Smith | |
| 2018/0373995 | A1 | 12/2018 | Tomaru et al. | |
| 2018/0375650 | A1 | 12/2018 | Legre | |
| 2019/0042964 | A1 | 2/2019 | Elsherbini et al. | |
| 2019/0042965 | A1 | 2/2019 | Clarke | |
| 2019/0042970 | A1 | 2/2019 | Zou | |
| 2019/0042971 | A1 | 2/2019 | Zou | |
| 2019/0042972 | A1 | 2/2019 | Zou | |
| 2019/0042973 | A1 | 2/2019 | Zou | |
| 2019/0049495 | A1 | 2/2019 | Ofek | |
| 2019/0251478 | A1 | 8/2019 | Bishop et al. | |
| 2019/0266512 | A1 | 8/2019 | Shen et al. | |
| 2019/0302832 | A1 | 10/2019 | Morgan et al. | |
| 2019/0317589 | A1 | 10/2019 | Mathur et al. | |
| 2019/0385088 | A1 | 12/2019 | Naaman et al. | |
| 2020/0160205 | A1* | 5/2020 | Leipold | G06N 10/00 |
| 2020/0218847 | A1* | 7/2020 | Martiel | G06N 10/20 |
| 2020/0244253 | A1* | 7/2020 | Cohen | G06F 15/80 |
| 2020/0293080 | A1 | 9/2020 | Poon et al. | |
| 2020/0364602 | A1 | 11/2020 | Niu et al. | |
| 2021/0004707 | A1 | 1/2021 | Gambetta et al. | |
| 2021/0103847 | A1 | 4/2021 | Akzam | |
| 2021/0105135 | A1* | 4/2021 | Figueroa | H04B 10/70 |
| 2021/0125096 | A1 | 4/2021 | Puri et al. | |
| 2021/0182723 | A1* | 6/2021 | Schmitz | G06N 10/40 |
| 2021/0279625 | A1* | 9/2021 | Shani | G06N 10/40 |
| 2021/0359670 | A1 | 11/2021 | Cohen et al. | |
| 2022/0335319 | A1* | 10/2022 | Zhang | G06N 10/40 |

FOREIGN PATENT DOCUMENTS

| | | | |
|---|---|---|---|
| CN | 104467843 | | 3/2015 |
| CN | 105281886 | A | 1/2016 |
| CN | 105912070 | A | 8/2016 |
| CN | 107408223 | A | 11/2017 |
| CN | 108111306 | A | 6/2018 |
| CN | 108594214 | A | 9/2018 |
| CN | 108698815 | A | 10/2018 |
| CN | 109165744 | A | 1/2019 |
| CN | 108780129 | A | 11/2019 |
| CN | 110677210 | | 1/2020 |
| CN | 111464154 | | 7/2020 |
| CN | 111767055 | A | 10/2020 |
| CN | 112019193 | | 12/2020 |
| CN | 112149832 | A | 12/2020 |
| EP | 0388052 | | 9/1990 |
| IN | 110085094 | A | 8/2019 |
| JP | 2007049009 | A | 2/2007 |
| JP | 2011175078 | | 9/2011 |
| JP | 2012188875 | | 10/2012 |
| WO | 2015178991 | A2 | 11/2015 |
| WO | 2015178992 | A2 | 11/2015 |
| WO | 2017078735 | A1 | 5/2017 |
| WO | 2017123940 | | 7/2017 |
| WO | 2017139683 | A1 | 8/2017 |
| WO | 2018055607 | | 3/2018 |
| WO | 2018062991 | A1 | 4/2018 |
| WO | 2019063117 | A1 | 4/2019 |
| WO | 2020033807 | A1 | 2/2020 |
| WO | 2020231795 | A1 | 11/2020 |
| WO | 2021/123903 | | 6/2021 |

OTHER PUBLICATIONS

Int'l Search Report and Written Opinion Appln No. PCT/IB2019/001410 mailed Jun. 10, 2020.

Int'l Search Report and Written Opinion Appln No. PCT/IB2019/001394 mailed Jun. 17, 2020.

Zhang J, Hegde SS, Suter D. Pulse sequences for controlled 2-and 3-qubit gates in a hybrid quantum register. arXiv preprint arXiv:1806.08408. Jun. 21, 2018.

Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.

Int'l Search Report and Written Opinion Appln No. PCT/IB2020/000218 mailed Aug. 11, 2020.

Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).

Int'l Search Report and Written Opinion Appln No. PCT/IB2020/000376 mailed Sep. 17, 2020.

Breitfelder et al. eds., IEEE 100: The Authoritative Dictionary of IEEE Standards Terms 1247, definition 2 of "variable" (7th ed. 2000). (Year: 2000).

Int'l Search Report and Written Opinion Appln No. PCT/IB2020/000707 mailed Jan. 12, 2021.

National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4, pp. 30, 57.

IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.

(56) References Cited

OTHER PUBLICATIONS

Int'l Search Report and Written Opinion Appln No. PCT/IB2020/000704 mailed Jan. 17, 2021.
Wolfowicz, et al. Pulse Techniques for Quantum Information Processing University of Chicago, University College London, eMagRes, 2016, vol. 5: 1515-1528. DOI 10.1002/9780470034590.emrstm1521.
Int'l Search Report and Written Opinion Appln No. PCT/IB2020/000555 mailed Dec. 27, 2020.
Int'l Search Report and Written Opinion Appln No. PCT/IB2020/000760 mailed Jan. 27, 2021.
"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf> McDermott R. et al. Oct. 12, 2017 (Oct. 12, 2017) Section VI, VII, VIII.
Roffe, J., Quantum Error Correction: An Introductory Guide, Dept. of Physics & Astronomy, Univ. of Sheffeld, UK, Oct. 10, 2019, pp. 1-29.
Int'l Preliminary Report on Patentability Appln No. PCT/IB2020/000218 mailed Sep. 16, 2021.
Int'l Preliminary Report on Patentability Appln No. PCT/IB2020/000376 mailed Nov. 12, 2021.
Int'l Search Report and Written Opinion Appln No. PCT/IB2021/056254 mailed Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARRFTG). IEEE, 2015. Dec. 31, 2015 (Dec. 31, 2015).
Int'l Preliminary Report on Patentability Appln No. PCT/IB2020/000555 mailed Feb. 10, 2022.
Int'l Preliminary Report on Patentability Appln No. PCT/IB2020/000707 mailed Mar. 17, 2022.
Int'l Preliminary Report on Patentability Appln No. PCT/IB2020/000704 mailed Mar. 17, 2022.
Int'l Preliminary Report on Patentability Appln No. PCT/IB2020/000760 mailed Apr. 7, 2022.
Int'l Search Report and Written Opinion Appln No. PCT/IB2022/050190 mailed Apr. 11, 2022.
Int'l Search Report and Written Opinion Appln No. PCT/IB2022/000059 mailed Jul. 7, 2022.
Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-8717-42bd-a077-c24b7281cd94 May 10, 2019 (May 10, 2019).
Int'l Preliminary Report on Patentability Appln No. PCT/IB2020/001004 mailed Jun. 30, 2022.
Int'l Search Report and Written Opinion Appln No. PCT/IB2022/000024 mailed Jul. 18, 2022.
Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).
Int'l Search Report and Written Opinion Appln No. PCT/IB2022/000068 mailed Jul. 17, 2022.
D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).
European Office Communication with extended Search Report Appln No. 20845965.1 dated Jun. 29, 2023.
European Office Communication with extended Search Report Appln No. 20861242.4 dated Jul. 7, 2023.
European Office Communication with extended Search Report Appln No. 23153085.8 dated Jul. 3, 2023.
Yang Yet al: "FPGA-based electronic system for the control and readout of superconducting qubit systems", arxiv.org, Cornell University Library, 201 Yang Yet al: "FPGA-based electronic system for the control and readout of superconducting qubit systems", arxiv.org, Cornell University Library, 201 OLIN Library Cornell University Ithaca, NY 14853, Oct. 15, 2021 (Oct. 15, 2021), XP091078848.
Gebauer Richard et al: "A modular RFSoC-based approach to interface superconducting quantum bits", 2021 International Conference on Field-Programmable Technology (ICFPT), IEEE, Dec. 6, 2021 (Dec. 6, 2021), pp. 1-9, XP034028257, DOI: 10.1109/ICFPT52863.2021.9609909 [retrieved on Nov. 8, 2021].
European Office Communication with extended Search Report Appln No. 20861100.4 dated Jul. 21, 2023.
Fu et al. "eQASM: An Executable Quantum 1-15 Instruction Set Architecture", 2019 IEEE International Symposium on High Performance Computer Architecture (HPCA), IEEE Feb. 16, 2019 (Feb. 16, 2019), pp. 224-237, XP033532496, DOI: 10.1109/HPCA.2019.00040 Retrieved from the Internet: URL: https://ieeexplore.ieee.org/abstract/document/8675197/authors#authors [retrieved on Mar. 26, 2019].
Yunong Shi et al: "Optimized Compilation of Aggregated Instructions for Realistic Quantum Computers", arxiv.org, Cornell University Library, 201 OLIN Library Cornell University Ithaca, NY 14853, Feb. 4, 2019 (Feb. 4, 2019), XP081025321, DOI: 10.1145/3297858.3304018.
Chinese Patent Office Action Appln No. 2019800888907 with search report dated Jul. 28, 2023 with translation.
European Office Communication with extended Search Report Appln No. 20869503.1 dated Sep. 12, 2023.
Chinese Patent Office Action Appln No. 2019800902340 with search report dated Aug. 30, 2023 with translation.
Int'l Preliminary Report on Patentability Appln No. PCT/IB2022/050190 mailed Oct. 19, 2023.
Int'l Preliminary Report on Patentability Appln No. PCT/IB2022/000068 mailed Nov. 23, 2023.
Int'l Preliminary Report on Patentability Appln No. PCT/IB2022/000059 mailed Nov. 23, 2023.
Int'l Preliminary Report on Patentability Appln No. PCT/IB2022/000024 mailed Nov. 9, 2023.
Lavoie et al., "A Formalization for Specifying and Implementing Correct Pull-Stream Modules," in arXiv preprint arXiv: 1801.06144 (2018). (Year: 2018).
Fu et al., "A Microarchitecture for a Superconducting Quantum Processor," in 38.3 IEEE Micro 40-47 (2018). (Year: 2018).
Extended European Search Report Appln No. 19889443.8 dated Aug. 4, 2022.
Int'l Search Report and Written Opinion Appln No. PCT/IB2022/054903 mailed Sep. 8, 2022.
Int'l Preliminary Report on Patentability Appln No. PCT/IB2021/000067 mailed Sep. 22, 2022.
Int'l Search Report and Written Opinion Appln No. PCT/IB2022/053304 mailed Oct. 6, 2022.
Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.
Extended European Search Report Appln No. 19910800.2 dated Oct. 6, 2022.
Hornibrook J Met al: "Cryogenic Control Architecture for Large-Scale Quantum Computing", arxiv.org, Cornell University Library, 201 OLIN Library Cornell University Ithaca, NY 14853, Sep. 8, 2014 (Sep. 8, 2014), XP081391509.
Fu X et al: "An Experimental Microarchitecture for a Superconducting Quantum Processor", MICRO-50 '17: Proceedings of the 50th Annual IEEE/ACM International Symposium on Microarchitecture, Cornell University Library, 201 OLIN Library Cornell University Ithaca, NY 14853, Oct. 14, 2017 (Oct. 14, 2017), pp. 1-13, XP081291220.
Zopes J. et al: "High resolution quantum sensing with shaped control pulses", arxiv.org, Cornell University Library, 201 OLIN Library Cornell University Ithaca, NY 14853, May 22, 2017 (May 22, 2017), XP081276850.
Cross et al. "Open Quantum Assembly Language", Jan. 10, 2017.
European Office Communication with extended Search Report Appln No. 20766036.6 dated Nov. 24, 2022.

(56) References Cited

OTHER PUBLICATIONS

Japanese Patent Office Action Appln No. 2021-529723 dated Oct. 26, 2022 with translation.
Int'l Search Report and Written Opinion Appln No. PCT/IB2020/001004 mailed May 13, 2021.
Int'l Preliminary Report on Patentability Appln No. PCT/IB2019/001410 mailed Jun. 10, 2021.
Int'l Search Report and Written Opinion Appln No. PCT/IB2021/000067 mailed Jun. 21, 2021.
Int'l Preliminary Report on Patentability Appln No. PCT/IB2019/001394 mailed Jul. 29, 2021.

* cited by examiner

SYSTEM AND METHOD FOR CONFIGURABLE AND DISTRIBUTED PROCESSING FOR QUANTUM CONTROL

CROSS-REFERENCE TO RELATED APPLICATIONS

Co-pending application Ser. No. 17/020,135, filed Sep. 14, 2020 is incorporated herein by reference in its entirety.

BACKGROUND

Limitations and disadvantages of conventional quantum controllers will become apparent to one of skill in the art, through comparison of such approaches with some aspects of the present method and system set forth in the remainder of this disclosure with reference to the drawings.

BRIEF SUMMARY

Methods and systems are provided for configurable and distributed processing in a quantum controller, substantially as illustrated by and/or described in connection with at least one of the figures, as set forth more completely in the claims.

DETAILED DESCRIPTION

Figure 1A:
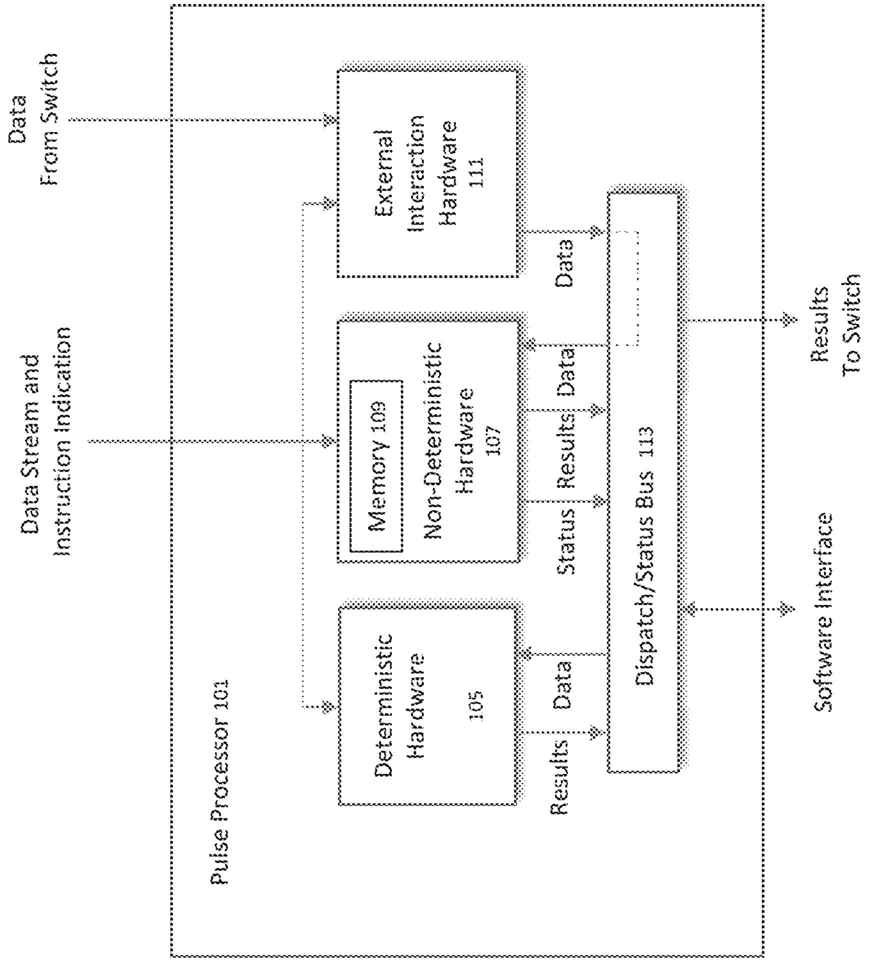
FIG. 1A illustrates a first example system for configurable processing in a quantum controller (QC) in accordance with various example implementations of this disclosure.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Logical operations in classical computers are performed on fixed states. For example, at time 0 a bit is in a first state, at time 1 a logic operation is applied to the bit, and at time 2 the bit is in a second state as determined by the state at time 0 and the logic operation. The state of a bit is typically stored as a voltage (e.g., 1 $V_{dc}$ for a "1" or 0 $V_{dc}$ for a "0"). The logic operation typically comprises of one or more transistors.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle+\beta|1\rangle$, where $|0\rangle$ and $|1\rangle$ are two basis states, and $\alpha$ and $\beta$ are complex numbers, usually called probability amplitudes, which satisfy $|\alpha|^2+|\beta|^2=1$. Using this notation, when the qubit is measured, it will be 0 with probability $|\alpha|^2$ and will be 1 with probability $|\beta|^2$. The basis states $|0\rangle$ and $|1\rangle$ can also be represented by two-dimensional basis vectors $$\begin{bmatrix}1\\0\end{bmatrix} \text{ and } \begin{bmatrix}0\\1\end{bmatrix},$$

respectively. The qubit state may represented by $$\begin{bmatrix}\alpha\\\beta\end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers. In fact, some problems that are intractable for classical computers may become trivial for quantum computers.

Unlike a classical bit, a qubit cannot be stored as a single voltage value on a wire. Instead, a qubit is physically realized using a two-level quantum mechanical system. For example, at time 0 a qubit is described as $$\begin{bmatrix}\alpha_1\\\beta_1\end{bmatrix},$$

at time 1 a logic operation is applied to the qubit, and at time 2 the qubit is described as $$\begin{bmatrix}\alpha_2\\\beta_2\end{bmatrix}.$$

Many physical implementations of qubits have been proposed and developed over the years. Some examples of qubits implementations include superconducting circuits, spin qubits, and trapped ions.

A quantum orchestration platform (QOP) may comprise a quantum controller (QC), a quantum programming subsystem and a quantum processor.

It is the job of a QC to generate the precise series of external signals, usually pulses of electromagnetic waves and pulses of base band voltage, to perform the desired logic operations (and thus carry out the desired quantum algorithm).

The quantum programming subsystem comprises circuitry operable to generate a quantum algorithm description which configures the QC and includes instructions the QC can execute to carry out the quantum algorithm (i.e., generate the necessary outbound quantum control pulse(s)) with little or no human intervention during runtime. In an example implementation, the quantum programming system is a personal computer comprising a processor, memory, and other associated circuitry (e.g., an x86 or x64 chipset). The quantum programming subsystem then compiles the high-level quantum algorithm description to a machine code version of the quantum algorithm description (i.e., series of binary vectors that represent instructions that the QC's hardware can interpret and execute directly).

The quantum programming subsystem may be coupled to the QC via an interconnect which may, for example, utilize a universal serial bus (USB), a peripheral component interconnect (PCIe) bus, wired or wireless Ethernet, or any other suitable communication protocol.

The QC comprises circuitry operable to load the machine code quantum algorithm description from the programming subsystem via the interconnect. Then, execution of the machine code by the QC causes the QC to generate the necessary outbound quantum control pulse(s) that correspond to the desired operations to be performed on the quantum processor (e.g., sent to qubit(s) for manipulating a state of the qubit(s) or to readout resonator(s) for reading the state of the qubit(s), etc.). Depending on the quantum algorithm to be performed, outbound pulse(s) for carrying out the algorithm may be predetermined at design time and/or may need to be determined during runtime. The runtime determination of the pulses may comprise performance of classical calculations and processing in the QC during runtime of the algorithm (e.g., runtime analysis of inbound pulses received from the quantum processor).

During runtime and/or upon completion of a quantum algorithm performed by the QC, the QC may output data/results to the quantum programming subsystem. In an example implementation these results may be used to generate a new quantum algorithm description for a subsequent run of the quantum algorithm and/or update the quantum algorithm description during runtime.

A QC comprises a plurality of pulse processors, which may be implemented in a field programmable gate array, an application specific integrated circuit or the like. A pulse processor is operable to control outbound pulses that drive a quantum element (e.g., one or more qubits and/or resonators). A pulse processor is also operable to receive inbound pulses from a quantum element.

FIG. 1A illustrates a first example pulse processor 101 for configurable processing in a QC in accordance with various example implementations of this disclosure. The pulse processor 101 comprises deterministic hardware circuit(s) 105, non-deterministic hardware circuit(s) 107, memory 109, a bus 113, an external interaction hardware circuit 111, and a dispatch/status bus 113.

The pulse processor 101 comprises signal processing circuitry that receives local data and instructions as well as data from external resources via a switch. These inputs may indicate a quantum computer state or a trigger for processing a quantum computer state. Such indications may affect the program control flow.

The deterministic hardware 105 may comprise a plurality of classical computation blocks such as an arithmetic logic unit, a comparator logic unit, a multiplier, a counter, a configurable delay and a programmable Boolean operator. While these classical computation blocks 105 are sufficient to perform many computations, they may not be optimal, alone, for running complex algorithms, such as quantum error correction, FFT analysis, random number generation and/or curve fitting. These classical computation blocks 105 alone also do not allow running user-specific computations of a feedback pulse from the quantum processor.

For configurable, non-deterministic computations, the pulse processor 101 comprises non-deterministic hardware 107. The non-deterministic hardware 107 may comprise a central processing unit (CPU) (e.g., RISC, ARM or x86), a graphics processing unit (GPU) and/or a dedicated offload acceleration engine (OAE) that is optimized to particular algorithms. The external interaction hardware 111 may provide an interface to one or more external QC's that may enable additional non-deterministic computations via distributed pulse processors (described further regarding FIG. 2 below).

The non-deterministic hardware may also comprise an artificial intelligence (AI) engine and/or a direct memory access (DMA) engine. An AI engine may be used to perform dynamically complex processing of the inbound pulses. The DMA engine may initiate memory access to an internal memory device such as a DDR memory device. The DMA may fetch relevant program information that cannot be fully stored in the pulse processor due to an on-chip memory limitation. The DMA may distribute the program information to the pulse processor and quantum controller components. The program information may, for instance, comprise a complex program that may be uploaded in part, in real time. The pulse processor may reload the quantum controller, in part, from the DDR during runtime and update all memory contents of the quantum controller.

The non-deterministic hardware 107 may be configured and controlled in various ways. The non-deterministic hardware 107 may receive, via a local input, instructions to perform a predetermined algorithm. The instructions may be associated with parameters or a stream of data. The non-deterministic hardware 107 may also receive instructions via a metadata descriptor specifying the desired operation. The metadata may be written directly to memory 109 that is periodically polled by the non-deterministic hardware 107. Alternatively, the non-deterministic hardware 107 may receive an interrupt that initiates the reading of metadata from the memory 109. Metadata arriving directly to the non-deterministic hardware 107 may also trigger an interrupt. The non-deterministic hardware 107 may also receive, via a local input, a memory address pointer to an executable program in memory 109.

The non-deterministic hardware 107 may receive inputs from the dispatch/status bus 113 and write results back to the dispatch/status bus 113 to allow communication with the local deterministic hardware 105 as well as communication with the external resources via the external interaction hardware 111. The external interaction hardware 111 may directly access the memory 109 to write data vectors (e.g., input via a switch, such as the QC switch 205 in FIG. 2) to a memory buffer. The non-deterministic hardware 107 may specify its status to the dispatch/status bus 113. Status may include, for example, idle, request, request granted, request in progress, request ready for data, request finished and result ready.

The inputs of the non-deterministic hardware 107, received by the dispatch/status bus 113, may include a descriptor, in the form of an address pointer to a memory 109 or an opcode with the instruction of how to perform a predefined operation.

The inputs of the non-deterministic hardware 107, received by the dispatch/status bus 113, may include a stream of data from the deterministic hardware 105, to operate upon. For An example, the non-deterministic hardware 107 may perform an FFT operation on an inbound pulse arriving to the pulse processor and demodulated by the deterministic hardware 105. The non-deterministic hardware 107 may return the result, as well as the status representing when the result is valid, to the dispatch/status bus, where the result may be sent back to the deterministic hardware 105 for further processing. The status in the dispatch/status bus can be used to create a complex operation incorporating both the deterministic hardware 107 and the non-deterministic and low-latency deterministic hardware 105. The non-deterministic hardware 107 may be embedded inside the quantum controller as a part of the protocol executed.

The memory 109 may provide resources for running complex programs and low latency operations. The memory 109 may be embedded in or external to the non-deterministic hardware 107.

The external interaction hardware 111 may comprise software configurable building blocks such as static constants, dynamic constants, a register space accessible to an external quantum programming sub system and multi controller building blocks responsible to share information across multiple controllers. These software configurable building blocks may be asynchronously updated via a software interface, such as Ethernet or PCIe. The dynamic constants can be used to provide software feedback and thus effect the non-deterministic hardware 107 operation. The dynamic constants can also be used via a dispatch mechanism, to asynchronously manipulate one or more of an amplitude, phase, time and frequency of an outbound pulse. The external interaction hardware 111 may comprise a digital input handler to operate on a set of digital inputs to the quantum controller. The external interaction hardware 111 may comprise a variety of analog/digital capture circuitry.

One or more of the dispatch destinations may be sent to a QC register space in the dispatch/status bus 113, which is readable via dedicated software interface, to expose internal computations and results of the non-deterministic hardware 107. One or more of the dispatch destinations may be sent through the software interface directly to a user resource to expose internal computation to a user. Based on the internal state, the user may be able to extract important information of the quantum program and recalibrate it to a more optimal execution.

A quantum algorithm may utilize deterministic hardware 105 and non-deterministic hardware 107 via the dispatch/status bus 113. For example, the non-deterministic hardware 107 may operate on a stream of data arriving from the deterministic hardware 105. Operation of the non-deterministic hardware 107 may be controlled via metadata and/or an opcode. The steam of data may represent a state estimation stream of data or be associated with a received inbound pulse representing a qubit state. The interaction between the deterministic hardware 105 and the non-deterministic hardware 107 may be treated as deterministic in latency in some scenarios. An interaction with external software may govern a protocol via software writes to the dispatch/status bus 113 and/or one or more dynamic constants within the external interaction hardware 111.

When the non-deterministic hardware 107 resides within the pulse processor 101 there may be an upper limit on the amount of time until receiving a result to the bus 113. There may also be an upper limit on the amount of time until receiving a result when the non-deterministic hardware 107 resides externally, but in conjunction with the control status indication that the pulse processor has been given an exclusive allocation of the non-deterministic hardware 107. In either case, a pipeline comprising the pulse processor 101 may be assumed as deterministic as long as the maximal threshold is used before utilizing the non-deterministic building block values on the bus 113.

Figure 1B:
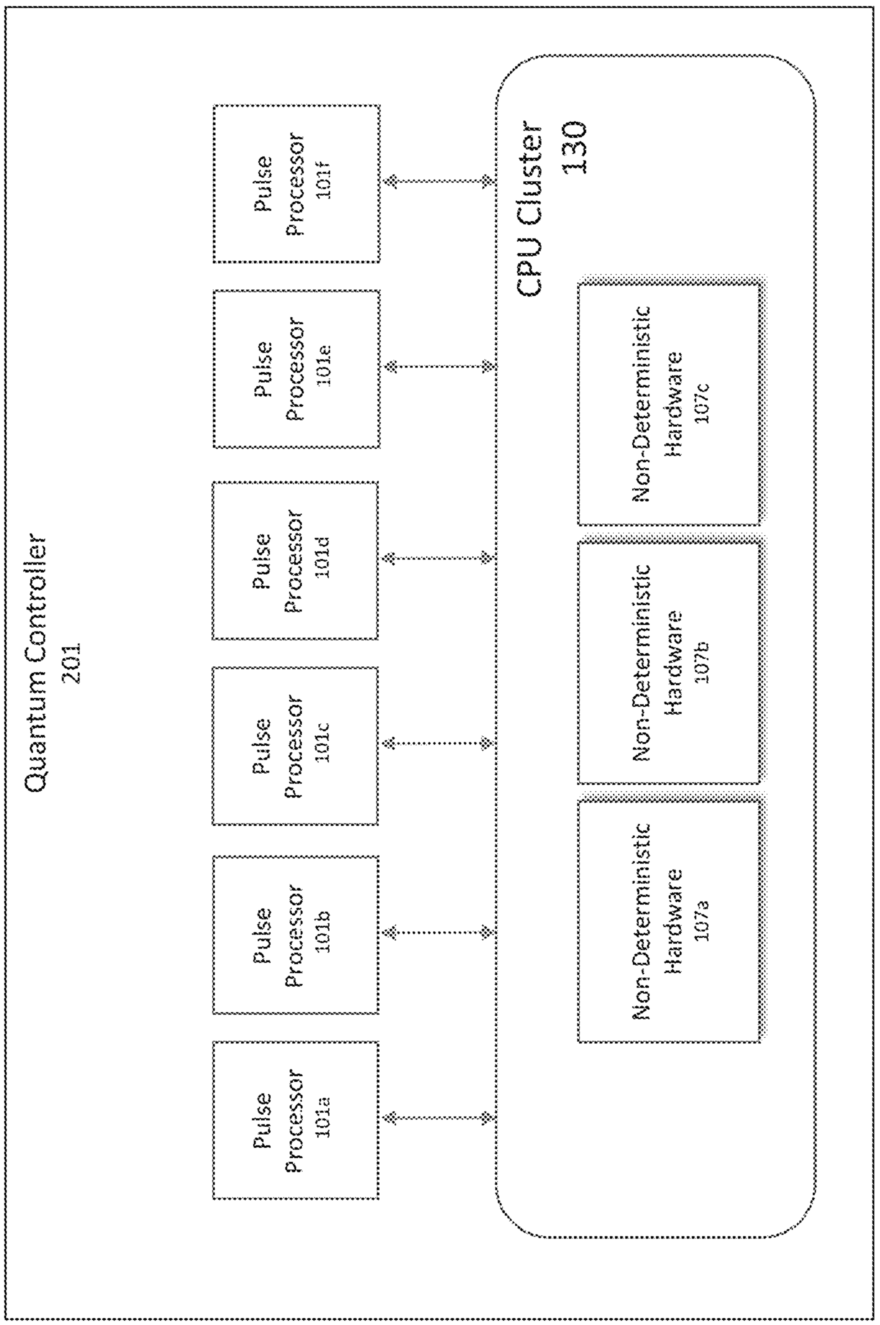
FIG. 1B illustrates a second example system for configurable processing in a quantum controller (QC) in accordance with various example implementations of this disclosure.

In some scenarios, non-deterministic hardware 107 (e.g., ARM, X86, GPU . . . ) may be larger than a pulse processor 101 and may have a larger throughput. FIG. 1B illustrates a second example system for configurable processing in a quantum controller (QC) in accordance with various example implementations of this disclosure. In FIG. 1B, one or more non-deterministic building blocks 107*a-c* may be placed outside of one or more pulse processors 101*a-f*. Each pulse processor 101*a-f* may interface with any non-deterministic building block 107*a-c* that is external to the pulse processors 101*a-f* and internal to the QC 201. Each non-deterministic building block 107*a-c* may also service a plurality of pulse processors 101*a-f*. In some scenarios, the pulse processors 101*a-f* may seldom require the non-deterministic hardware 107*a-c*. For example, in some scenarios, a single OAE 107*a* may be used by a plurality of pulse processors 101*a-f*.

To allow full integration of the non-deterministic hardware 107*a-c* in a CPU cluster 130, a pulse processor bus may specify the status of the non-deterministic building blocks (e.g., Idle, request, request granted, request in progress, request ready for data, request finished and result ready).

Figure 2:
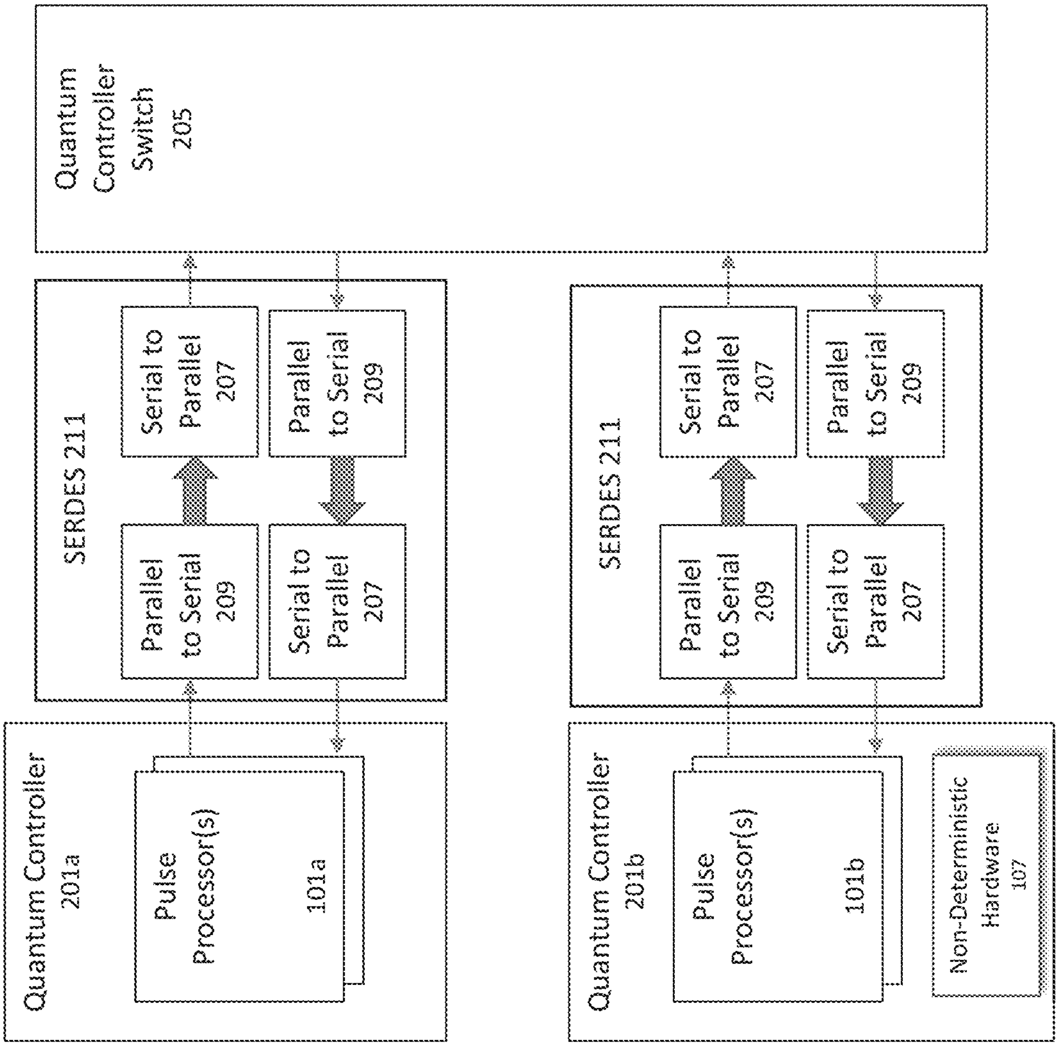
FIG. 2 illustrates an example system for distributive processing among QC's in accordance with various example implementations of this disclosure.

FIG. 2 illustrates an example system for distributive processing among QC's 201*a* and 201*b* in accordance with various example implementations of this disclosure.

Each QC 201*a* and 201*b* may include one or more pulse processors 101 as described above regarding FIG. 1. Each pulse processor 101*a* or 101*b*, in QC's 201*a* and 201*b* respectively, may share data, metadata and computational values with every pulse processor 101*a* and 101*b* and make joint decision regarding the control flow and the quantum data sent to the quantum elements. Pulse processors 101*a* and 101*b* may, therefore, be operable synchronously. Because each QC 201*a* and 201*b* only has a limited set of pulse processors 101*a* and 101*b* respectively, one QC 201*a* and 201*b* may only be operable to control a quantum device with a limited number of quantum elements. In some scenarios, however, a quantum algorithm may require multiple pulse processors 101*a* and 101*b* across the plurality of QC's 201*a* and 201*b* to perform joint processing. A large number of parallel operations may be required across these multiple QC's 201*a* and 201*b*.

The pulse processors 101*a* and 101*b* may be coupled to a QC switch 205 via dedicated low-latency SERDES interfaces 211, comprising serial to parallel converters 207 and parallel to serial converters 209. The plurality of pulse processors 101*a* and 101*b* may communicate directly to one another via the QC switch 205.

The QC switch 205 receives all inputs from all pulse processors 101*a* and 101*b* and sends this data back to each pulse processor 101*a* and 101*b*. Therefore, the external interaction hardware 111 in FIG. 1 receives all of the data (including locally generated data) shared by all of the pulse processors 101*a* and 101*b*.

The external interaction hardware 111 in FIG. 1 is also operable to receive a selector signal and an enable signal every new cycle. The external interaction hardware 111 in FIG. 1 can update its registers, in the dispatch/status bus of FIG. 1, with any of the data from the QC switch 205, if enable is set. A dispatch destination, from a dispatch/status bus in pulse processor 101*a*, may be external interaction hardware in pulse processor 101*b*, thereby allowing pulse processor 101*a* to send data vectors to a different QC 201*b*.

By sharing computational data and metadata information across a plurality of QC's 201*a* and 201*b*, a quantum programming sub-system may orchestrate the plurality of QC's 201*a* and 201*b* to act as a single large controller. This sharing enables joint decision making prior to sending outbound pulses to the quantum computer. While two QCs 201 may also be connected directly to one another without a switch 205, the switch 205 is operable to connect more than QCs 201. The pulse processors 101 may also share data and metadata directly without the switch 205.

One or more pulse processors 101*a* may communicate with non-deterministic building hardware 107 that is external to the QC 201*a*. For example, non-deterministic building hardware 107 (e.g., an AI engine or X86) on a different QC 201*b* through Ethernet/PCIe or dedicated SERDES 211 as used for the QC communication with the switch 205.

Digital inputs to the QC 201*a* may be used to transfer some indications of the qubits states, or may represent a trigger from an external device (when an external detector/amplifier/recorder is ready or that a photon was emitted).

The digital input handler may contain dedicated circuitry to capture rising or falling edges representing an event of a single digital input. It may be able to detect specific patterns for a set of digital inputs. For a case of several digital inputs representing an analog value bus, it may detect threshold crossing or rapid changes in value (threshold or derivate value) as well as interpolating the values before and after the threshold crossing to detect in resolution much higher than the sampling rate the event's time.

Figure 3:
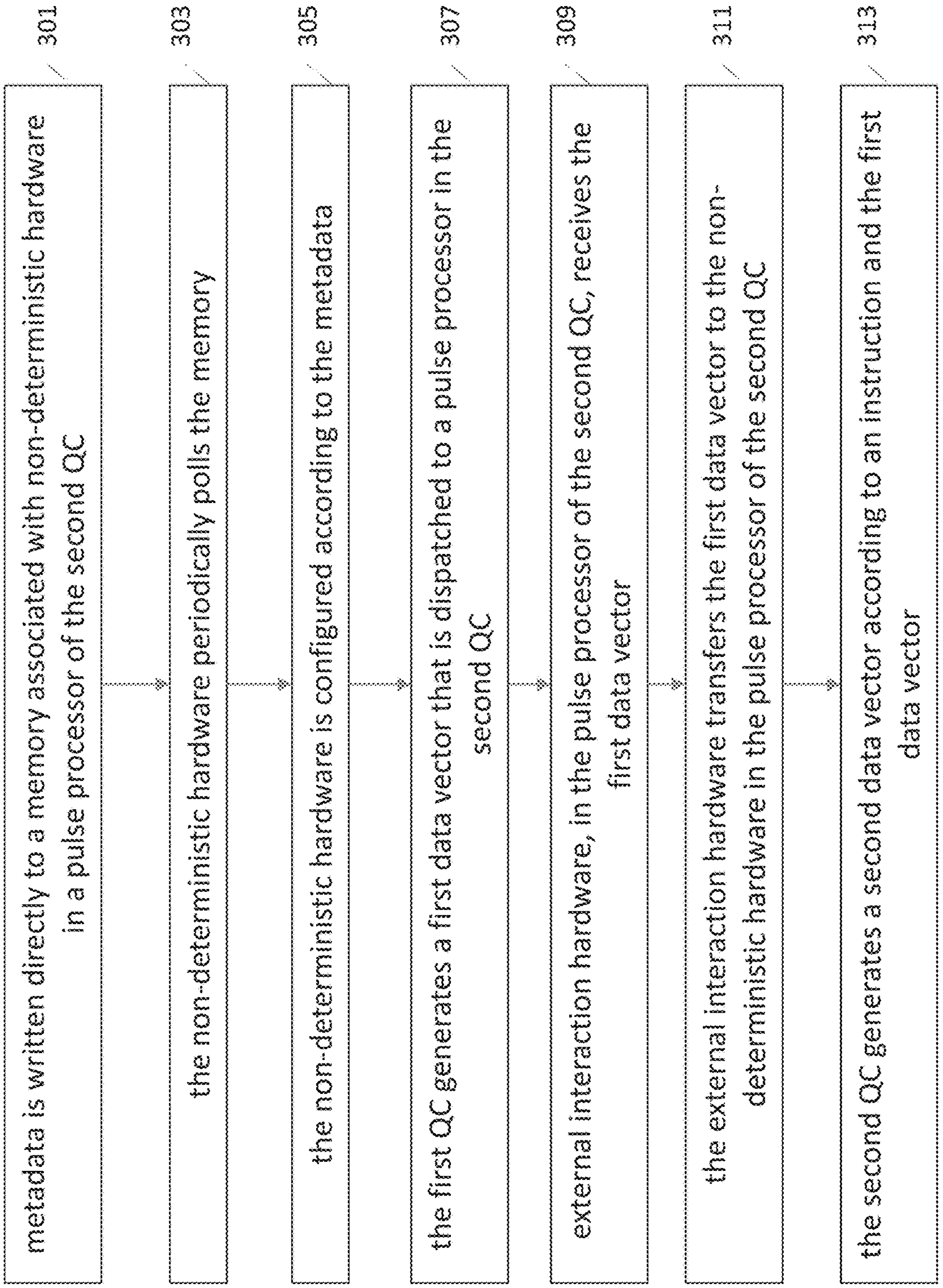
FIG. 3 illustrates a flowchart of an example method for configurable and distributive processing for quantum control in accordance with various example implementations of this disclosure.

FIG. 3 illustrates a flowchart of an example method for configurable and distributive processing for quantum control in accordance with various example implementations of this disclosure.

This method is described with respect to a first QC and a second QC operably coupled to a QC switch. However, this method may also be used with any number of QC's. Each of the first and second QC's may comprise one or more pulse processors. At least some of these pulse processors comprise deterministic hardware and non-deterministic hardware.

At step 301, metadata is written directly to a memory associated with non-deterministic hardware in a pulse processor of the second QC. At step 303, the non-deterministic hardware periodically polls the memory. At step 305, the non-deterministic hardware is configured according to the metadata. At step 307, the first QC generates a first data vector that is dispatched to a pulse processor in the second QC. The first data vector may comprises a quantum state estimate for each of a plurality of qubits. At step 309, external interaction hardware, in the pulse processor of the second QC, receives the first data vector.

At step 311, the external interaction hardware transfers the first data vector to the non-deterministic hardware in the pulse processor of the second QC. This transfer may comprise writing the first data vector directly to the memory associated with the non-deterministic hardware.

At step 313, the second QC generates a second data vector according to an instruction and the first data vector.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
a first quantum controller (QC) operable to generate a first data vector and an instruction; and
a second QC comprising a non-deterministic hardware circuit, wherein:
the non-deterministic hardware circuit is operable to generate a second data vector according to the first data vector and an operation,
the first data vector comprises a stream of data on a bus,
the instruction is distinct from the first data vector,
the instruction is encoded as a metadata descriptor comprising one or both of the operation and an address pointer to a memory location identifying the operation,
the metadata descriptor is written to a memory associated with the non-deterministic hardware circuit, and
the non-deterministic hardware circuit periodically polls the memory to configure operation on the first data vector according to the metadata descriptor.

2. The system of claim 1, wherein the non-deterministic hardware circuit is operable to serve a plurality of pulse processors.

3. The system of claim 2, wherein the non-deterministic hardware circuit resides externally to the plurality of pulse processors.

4. The system of claim 1, wherein the first QC and the second QC are operable to communicate asynchronously via a SERDES and an external interaction hardware circuit.

5. The system of claim 1, wherein the non-deterministic hardware circuit may operate on a stream of data arriving from a deterministic hardware circuit.

6. The system of claim 5, wherein the stream of data is associated with a qubit state.

7. The system of claim 1, wherein the non-deterministic hardware is operable to process a stream of data from an external interaction hardware circuit.

8. The quantum controller of claim 7, wherein the external interaction hardware circuit is operable to receive an external inbound stream of data, and wherein the external inbound stream of data is one of digital and analog.

9. The system of claim 1, wherein the non-deterministic hardware comprises one or more of a central processing unit (CPU), a graphics processing unit (GPU), an artificial intelligence (AI) engine, an offload acceleration engine (OAE) and a direct memory access (DMA) engine.

10. The system of claim 9, wherein the DMA engine is operable to read program data from an external device in real time, and wherein the quantum controller is operable to be dynamically reconfigured, and wherein the quantum controller is operable to run a contentious complex program regardless of on-chip memory resources.

11. The system of claim 1, wherein the second QC comprises one or more pulse processors.

12. The system of claim 11, wherein at least one of the one or more pulse processors comprises the non-deterministic hardware circuit.

13. The system of claim 11, wherein the at least one pulse processor comprises external interaction hardware circuit, and wherein the non-deterministic hardware circuit of the at least one pulse processor in the second QC is operable to receive the first data vector via the external interaction hardware circuit.

14. The system of claim 13, wherein the external interaction hardware circuit is operable to write directly to a memory associated with the non-deterministic hardware circuit.

15. The quantum controller of claim 11, wherein the one or more pulse processors comprises an external interaction hardware circuit operable to receive the first data vector from an external source, and wherein the external source is one of digital and analog.

16. The system of claim 1, wherein the system comprises a QC switch operably coupled to the first QC and the second QC.

17. The system of claim 1, wherein the first QC is operable to dispatch the first data vector to a pulse processor in the second QC.

18. A method for quantum computing, the method comprising:
generating, via a first quantum controller (QC), a first data vector and an instruction;
generating, via a non-deterministic hardware circuit of a second QC, a second data vector according to the first data vector and an operation, wherein:
the first data vector comprises a stream of data on a bus,
the instruction is distinct from the first data vector, and
the instruction is encoded as a metadata descriptor comprising one or both of the operation and an address pointer to a memory location identifying the operation;
writing the metadata descriptor to a memory associated with the non-deterministic hardware circuit; and
periodically polling the memory, by the non-deterministic hardware circuit, to configure operation on the first data vector according to the metadata descriptor.

19. The method of claim 18, wherein the non-deterministic hardware circuit is operable to serve a plurality of pulse processors.

20. The method of claim 19, wherein the non-deterministic hardware circuit resides externally to the plurality of pulse processors.

21. The method of claim 18, wherein the method comprises communicating asynchronously, between the first QC and the second QC, via a SERDES and an external interaction hardware circuit.

22. The method of claim 18, wherein the method comprises operating, via the non-deterministic hardware circuit, on a stream of data arriving from a deterministic hardware circuit.

23. The method of claim 22, wherein the stream of data is associated with a qubit state.

24. The method of claim 18, wherein the second QC comprises one or more pulse processors.

25. The method of claim 24, wherein at least one of the one or more pulse processors comprises the non-deterministic hardware circuit.

26. The method of claim 24, wherein the at least one pulse processor comprises external interaction hardware circuit, and wherein the method comprises receiving the first data vector, by the non-deterministic hardware circuit, via the external interaction hardware circuit.

27. The method of claim 26, wherein the method comprises writing, via the external interaction hardware circuit, directly to a memory associated with the non-deterministic hardware circuit.

28. The method of claim 18, wherein a QC switch is operably coupled to the first QC and the second QC.

29. The method of claim 18, wherein the method comprises dispatching the first data vector from the first QC to a pulse processor in the second QC.

* * * * *